Dec. 2, 1969  L. D. NICHOLS ET AL  3,481,945

TETRABENZIMIDAZOLE

Filed Dec. 9, 1966

Inventor:
Arthur S. Obermayer,
Larry D. Nichols,
by Russell, Chittick & Pfund
Attorneys United States Patent Office 3,481,945
Patented Dec. 2, 1969

3,481,945
TETRABENZIMIDAZOLE
Larry D. Nichols, West Roxbury, and Arthur S. Obermayer, Cambridge, Mass., assignors to Moleculon Corporation, a corporation of Massachusetts
Filed Dec. 9, 1966, Ser. No. 600,560
Int. Cl. C07d 49/38; C07f 1/08; C08g 33/02
U.S. Cl. 260—299
2 Claims

ABSTRACT OF THE DISCLOSURE

Tetrabenzimidazole, tetrabenzothiazole, and tetrabenzoxazole compounds and their chelates useful as chelating agents, dyes and semi-conductors.

This invention pertains to a new class of aromatic compounds characterized by their planar strain-free cyclic structures and their ability to exist in a variety of tautomeric, oxidation and ionization states. Tetrabenzimidazole is representative of this class of compounds.

The following description made with reference to the drawings attached thereto will serve to make the nature and advantages of this invention clear. In the drawings.

Figure 1:
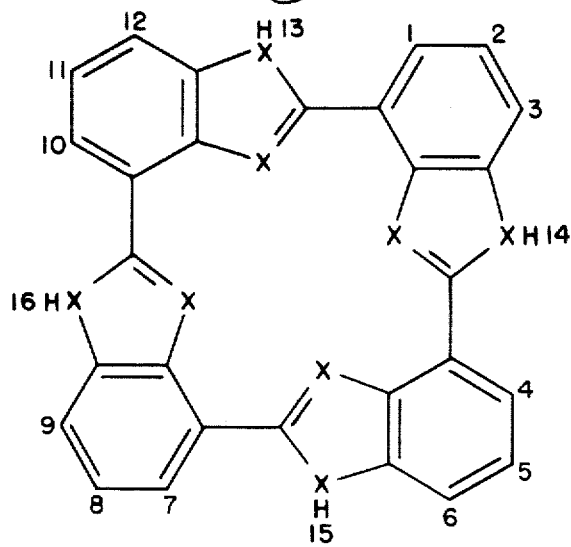
FIGURE 1 is a formula of the generic class of compounds.
Figure 2:
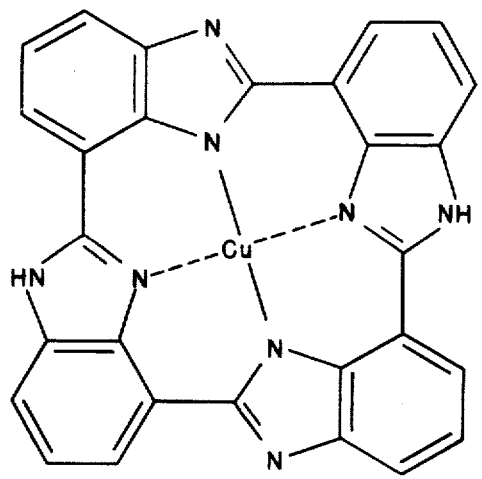
FIGURE 2 depicts a copper tetrabenzimidazole chelate. The drawings are schematic plane formulas according to Kekule and do not, of course, show the true resonant structures of the compounds.

With reference to FIG. 1, any one or all of the positions 1 through 12 can be substituted with a functional group such as an aryl, alkyl, benzo, naphtho, halo, nitroso, amino, acyl, hydroxy, sulfonyl, carboxy, azo, ether, or ester group. The X's are preferably nitrogens to give the imidazole structure, but can be combinations of nitrogen, oxygen or sulfur. The hydrogens in positions 13 through 16 are partially or entirely missing in the oxidized, chelated, or ionized forms, and in the forms where X is sulfur or oxygen. When X is nitrogen, the hydrogens in positions 13 through 16 may be substituted by aryl, alkyl, amino, halo, nitroso, hydroxy, acyl, or azo groups.

Preferably, positions 1 through 12 are hydrogen, and the X's are either nitrogen, oxygen, or sulfur.

The compounds are readily prepared by condensing the selected monomer using well known procedures. Usually, a multivalent metal and a phenolic compound will be used as catalysts.

The monomer has the general formula:

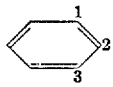

Position 1 is preferably substituted with a carboxy group, but can be substituted with an acid halide, amidine, ester, amide, hydroxamic acid, or acid anhydride group. Positions 2 and 3 can be substituted with a combination of amino, substituted amino, hydroxy, thiol, nitro, nitroso, azo, hydrazo, azido, amido, or hydroxylamino groups. The other positions on the benzene ring can be substitude with aryl, alkyl, benzo, naphtho, halo, nitroso, amino, acyl, hydroxy, sulfonyl, carboxy, azo, ether, or ester groups.

As one skilled in the art will appreciate, the compounds of this invention, because of their unique structures, are particularly useful as chelating agents. They can be used, for example, to separate uranium and plutonium or to extract gold from sea water. The usual structure of these compounds also suits them for such uses as semiconductors, catalysts, dyes, indicators, thin-film insulators, complexing agents through a central metal atom for oxygen or other small ligands, fluorescent pigments, and ion exchange materials.

When considered as semiconductors, it will be noted that the compounds are aromatic and have high electron mobilities and electron delocalizations within individual molecules. There can be large overlap integrals between adjacent molecules because of the close packing permitted by their planar nature. Central metal atoms with large orbitals can be incorporated. The molecules have the ability to stabilize the charged states that arise during electron transfer processes, which is related to their pronounced ability to exist in different oxidation states. The density of molecular packing and the barrier to electron transfer can both be made more favorable for conduction by the use of molecules bearing a full or partial electron charge. Ionic crystals can be made that contain both cationic and anionic species based on metal chelates of the various tautomeric oxidation states of the compounds.

Example 0.5 gram of 2,3-diaminobenzoic acid and 0.14 gram of $CuCl_2 \cdot 2H_2O$ were mixed with 1.42 gram of meta-cresol in a six inch test tube with a side arm. The mixture was refluxed for four hours under nitrogen at a temperature of about 200° C. After cooling, addition of 10 ml. of methanol precipitated 0.11 gram of dark platelets (melting point above 400° C.) which were washed with more methanol. Evaporation of the combined methanol fractions and slurrying of the residue with acetone gave 0.19 gram additional solids with a lower (about 270° C.) melting point. Solution of a portion of this latter material in concentrated $H_2SO_4$, followed by precipitation with distilled water, showed it to be composed 50% of a material with a true melting point of 270° C., and 50% of the higher melting compound (melting point above 400° C.). Thus the total yield of the latter was about 0.205 gram, or 47% of theoretical for the copper tetrabenzimidazole. The reaction is not critical, and the tetramer can be produced under a variety of conditions and even without a metal salt catalyst.

This copper chelate did not melt, sublime or decompose up to 500° C. It burned in an exposed flame with a green color, leaving an ash. It was soluble in, and unaffected by, sulfuric acid. It was moderately soluble in methanol, meta-cresol, dimethylsulfoxide, and dilute sulfuric acid. A $1.22 \times 10^{-5}$ molar solution in methanol containing about 1% sulfuric acid appeared deep blue by transmitted or reflected light, and pink by scattered light, while similar neutral solutions appeared simply pink. When irradiated with a dual-grating spectrofluorimeter, the acidic solution showed strong absorption peaks at 616μ (E=12,700), 571μ (E=7,900), 535μ (E=3,800), and 285μ (E=29,000). The neutral solution displayed peaks at 566μ (E=4,600), 535μ (E=5,100), 496μ (E=3,300), and the same strong absorption at 285μ.

Both acid and neutral forms have some continuous absorption from 285μ through 600μ.

The neutral solution showed two distinct and strong flourescent bands, a sharp one at 600μ and a broad one from 350 to 425μ. Both of these bands can be excited by any ionization of shorter wavelength than the fluorescene, the action spectrum being very similar to the absorption spectrum. The acidic solution exhibited similar fluorescene except that the 600μ peak was suppressed and displaced to 630μ.

While many of the above properties are similar to those exhibited by the phthalocyanines, the copper tetrabenzimidazole chelate is significantly more soluble in a variety of solvents, and also differs from copper phthalocyanine in being fluorescent.

This tetrabenzimidazole, when not in chelate form, can have four protons attached to external imidazole nitrogens and can, therefore, form four coordinate bonds with a central atom. One, two, three, or all of the valencies represented by these protons can be within the internal ring. These tautomers can chelate zero-, mono-, di-, and trivalent atoms, as well as tetravalent atoms.

In addition, the tetramer possesses two additional oxidation states, with two and zero imidazole protons, respectively. Thus, one can prepare from the oxidized form with no imidazole protons a chelate with ferrous iron, producing a doubly positive cation, and a doubly negative anion can be prepared from the chelate of the completely ionized, unoxidized form with ferrous iron. Neither of these has any free protons, and they will form a salt with each other having very tight packing.

All of the three stable oxidized states of the compound have basic azole nitrogens, and two of these states have relatively acidic protons as well. Their chelates can form charged cationic or anionic species in acidic or basic solution.

2,3-diaminobenzoic acid, the monomer commonly used to prepare tetrabenzimidazole, contains one carboxy group and two amino groups on a benzene ring. When the number of each of these functional groups on the benzene ring is doubled, with the proper arrangement, the compound is tetraaminoterephthalic acid. It has two carboxy groups and four amino groups in precisely the same relative arrangement as in 2,3-diaminobenzoic acid. When tetraaminoterephthalic acid is substituted for diaminobenzoic acid in the synthetic procedure described above, a two dimensional polymer results from the condensation. This polymer is composed of repeating units, each with a tetrabenzimidazole structure.

Having described this invention, what is sought to be protected by Letters Patent is succinctly set forth in the following claims:

1. A compound having the formula:

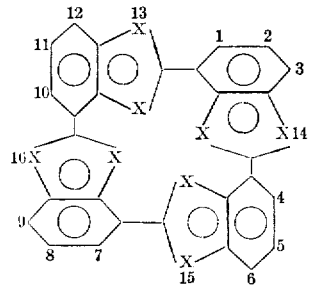

wherein the carbon atoms at positions 1 through 12 bear substituents selected from the group consisting of hydrogen lower alkyl, halo, and lower alkyl ether moieties wherein X is selected from the group consisting of combinations of nitrogen, oxygen and sulfur with at least one X in each five membered ring being nitrogen and when the X's in positions 13 through 16 represent nitrogen, the substituents on the nitrogen atoms in positions 13 through 16 are selected from the group consisting of hydrogen and lower alkyl groups.

2. A compound having the formula

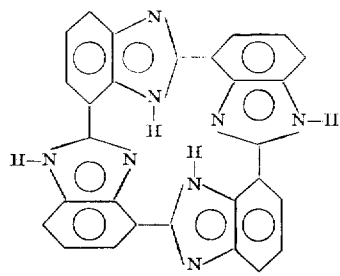

and the tautomers, oxidation, ionization and multivalent metal chelation forms thereof.

References Cited

UNITED STATES PATENTS

| | | | |
|---|---|---|---|
| 2,881,176 | 4/1959 | Hogsett | 260—299 |
| 2,967,860 | 1/1961 | Perlman et al. | 260—299 |
| 3,004,944 | 10/1961 | Kempermann et al. | 260—299 |

ALEX MAZEL, Primary Examiner

R. J. GALLAGHER, Assistant Examiner

U.S. Cl. X.R.

252—188, 301.2, 408, 426, 431; 260—78, 304, 307, 309.2

UNITED STATES PATENT OFFICE
CERTIFICATE OF CORRECTION

Patent No. 3,481,945            December 2, 1969

Larry D. Nichols et al.

It is certified that error appears in the above identified patent and that said Letters Patent are hereby corrected as shown below:

Column 2, line 5, "usual" should read -- unusual --. Colu 3, line 1, "acid" should read -- acidic --.

Signed and sealed this 17th day of November 1970.

(SEAL)
Attest:

Edward M. Fletcher, Jr.
Attesting Officer

WILLIAM E. SCHUYLER, J
Commissioner of Patent